United States Patent
Chang et al.

(10) Patent No.: US 8,972,909 B1
(45) Date of Patent: Mar. 3, 2015

(54) OPC METHOD WITH HIGHER DEGREE OF FREEDOM

(71) Applicant: Taiwan Semiconductor Manufacturing Co., Ltd., Hsin-Chu (TW)

(72) Inventors: Chia-Cheng Chang, Baoshan Township (TW); Jau-Shian Liang, New Taipei (TW); Wen-Chen Lu, Zhubei (TW); Chin-Min Huang, Taichung (TW); Ming-Hui Chih, Luzhou (TW); Cherng-Shyan Tsay, Toufen Township (TW); Chien-Wen Lai, Hsinchu (TW); Hua-Tai Lin, Hsinchu (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 14/038,943

(22) Filed: Sep. 27, 2013

(51) Int. Cl.
*G06F 17/50* (2006.01)
*G06F 19/00* (2011.01)
*G03F 1/00* (2012.01)
*G21K 5/00* (2006.01)

(52) U.S. Cl.
CPC ........ *G06F 17/5081* (2013.01); *G06F 2217/14* (2013.01); *G03F 1/00* (2013.01); *G21K 5/00* (2013.01); *G06F 17/5072* (2013.01); *G06F 19/00* (2013.01); *G06F 2217/12* (2013.01)
USPC ................. 716/53; 716/54; 716/55; 716/111; 716/132; 700/98; 700/120; 700/121; 430/5; 378/35; 382/144; 382/154

(58) Field of Classification Search
CPC . G06F 17/5081; G06F 17/5072; G06F 17/17; G06F 2217/12; G06F 2217/14; G06F 19/00; G03F 1/00; G21K 5/00
USPC .......... 716/53, 54, 55, 111, 132; 700/98, 120, 700/121; 430/4, 5; 378/34, 35; 382/144, 382/154
See application file for complete search history.

(56) References Cited

U.S. PATENT DOCUMENTS

| 6,811,954 | B1 * | 11/2004 | Fukuda .......................... 430/311 |
| 7,402,897 | B2 * | 7/2008 | Leedy ............................ 257/678 |
| 8,015,511 | B2 * | 9/2011 | Krasnoperova et al. ......... 716/50 |
| 8,438,505 | B2 * | 5/2013 | Tsai et al. ....................... 716/52 |
| 2010/0175041 | A1 * | 7/2010 | Krasnoperova et al. ......... 716/20 |
| 2012/0185807 | A1 * | 7/2012 | Tsai et al. ....................... 716/52 |

* cited by examiner

*Primary Examiner* — Phallaka Kik
(74) *Attorney, Agent, or Firm* — Eschweiler & Associates, LLC

(57) ABSTRACT

The present disclosure relates to a method of performing an optical proximity correction (OPC) procedure that provides for a high degree of freedom by using an approximation design layer. In some embodiments, the method is performed by forming an integrated chip (IC) design having an original design layer with one or more original design shapes. An approximation design layer, which is different from the original design layer, is generated from the original design layer. The approximation design layer is a design layer that has been adjusted to remove features that may cause optical proximity correction (OPC) problems. An optical proximity correction (OPC) procedure is then performed on the approximation design layer. By performing the OPC procedure on the approximation design layer rather than on the original design layer, characteristics of the OPC procedure can be improved.

20 Claims, 4 Drawing Sheets

OPC METHOD WITH HIGHER DEGREE OF FREEDOM

Integrated chip (IC) designs are complicated schematic layouts that contain millions or billions of semiconductor devices (e.g., transistors, capacitors, etc.) interconnected together by conductive wires. Typically, an IC design represents IC components as a plurality of polygons. Integrated chips are generated by operating on a semiconductor substrate with a plurality of processing steps (e.g., lithography, implantations, etching, etc.) to form on-wafer shapes corresponding to the polygons within the substrate.

As the size of integrated chip components has decreased, it has become increasingly difficult to form on-wafer shapes that accurately correspond to designed shapes due to image errors and/or processing effects. To make on-wafer shapes more closely resemble designed shapes a number of resolution enhancement techniques are used in modern day fabrication processes. One such resolution enhancement technique is optical proximity correction (OPC). OPC procedures reduce optical proximity effects on a designed shape by moving one or more edges of the design shape before the shape is written to a mask.

DETAILED DESCRIPTION

Figure 1:
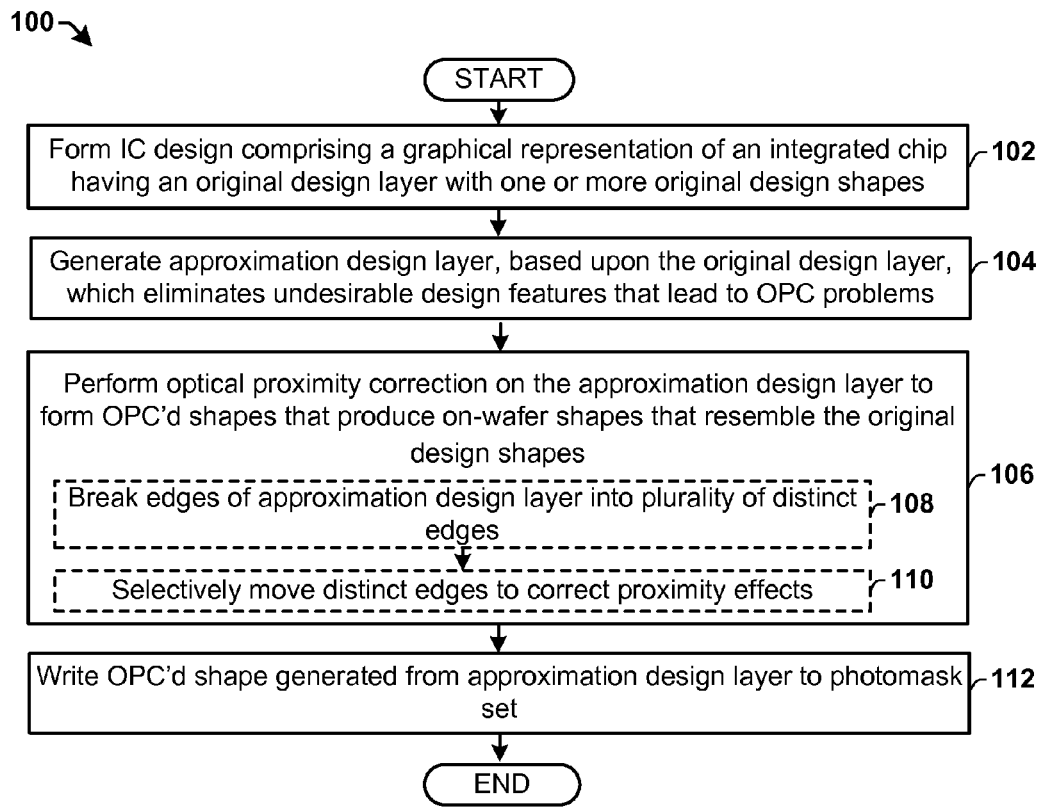
FIG. 1 illustrates a flow diagram of some embodiments of a method of performing an optical proximity correction (OPC) procedure on an approximation design layer.

The description herein is made with reference to the drawings, wherein like reference numerals are generally utilized to refer to like elements throughout, and wherein the various structures are not necessarily drawn to scale. In the following description, for purposes of explanation, numerous specific details are set forth in order to facilitate understanding. It may be evident, however, to one skilled in the art, that one or more aspects described herein may be practiced with a lesser degree of these specific details. In other instances, known structures and devices are shown in block diagram form to facilitate understanding.

Optical proximity correction (OPC) procedures are performed on integrated chip (IC) designs to correct for optical proximity effects by moving one or more edges of an IC design. OPC procedures may dissect a polygon of an original IC design into a plurality of separate edges and then selectively move one or more of the separate edges in a direction perpendicular to corresponding edges of the original IC design. By varying the shape of the polygon of the original design, on-wafer errors caused by optical proximity effects can be reduced.

However, it has been appreciated that moving the separate edges in a direction perpendicular to edges of the original IC design limits the degrees of freedom of an OPC procedure. The limitation to the degrees of freedom may lead to poor convergence of correction results and/or may cause difficulties in achieving an optimal solution for complicated IC designs. For example, perpendicular movement of an edge having a 45° angle may result in the formation of an unwanted negative polygon that can cause an OPC procedure to crash and/or may cause a simulated litho contour to be off-target.

Accordingly, the present disclosure relates to a method of performing an optical proximity correction (OPC) procedure that provides for a high degree of freedom by using an approximation design layer. In some embodiments, the method is performed by forming an integrated chip (IC) design comprising a graphical representation of an integrated chip having an original design layer with one or more original design shapes. An approximation design layer, which is different from the original design layer, is generated from the original design layer. The approximation design layer is a design layer that has been adjusted to remove features that may cause optical proximity correction (OPC) problems. An optical proximity correction (OPC) procedure is then performed on the approximation design layer. By performing the OPC procedure on the approximation design layer rather than on the original design layer, characteristics of the OPC procedure can be improved.

FIG. 1 illustrates a flow diagram of some embodiments of a method 100 of performing an optical proximity correction (OPC) procedure to correct an original design layer, by operating upon an approximation design layer that is different than the original design layer.

While method 100 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At 102, an integrated chip (IC) design comprising a graphical representation of an integrated chip is formed. The IC design comprises an original design layer having one or more original design shapes corresponding to structures that are to be formed on an integrated chip (i.e., on-wafer). In some embodiments, the original design shapes may comprise a plurality of polygons, wherein one or more of the polygons are connected together.

At 104, an approximation design layer, different than the original design layer, is generated from the original design layer. The approximation design layer is a design layer that is generated based upon the original design layer, but which eliminates undesirable design features of the original design layer that may lead to OPC problems. For example, the approximation layer can be generated to have one or more geometric features that enable better convergence of an OPC procedure and/or better shape fidelity for on-wafer shapes, with respect to the original design layer.

In some embodiments, the approximation design layer may be generated by modifying an original design layer to remove unwanted features. In some embodiments, an approximation design shape may be generated by modifying an original design shape to replace an angled edge (e.g., having a slope of 30°, 45°, 60°, etc.) with a vertical edge and a horizontal edge. For example, in some embodiments an approximation design shape may be generated by modifying an original design shape to replace a 45° edge having a substantially 45° slope with a vertical edge (having a 90° slope)

and a horizontal edge (having a 0° slope). In such embodiments, replacement of the 45° edge with the vertical/horizontal edges eliminates problems that the 45° edge may cause during operation of a subsequent OPC procedure. For example, removal of the 45° edge may improve OPC convergence, fidelity of on-wafer shapes, or features formed on mask.

At 106, an optical proximity correction (OPC) procedure is performed on the approximation design layer to form an OPC layer having one or more OPC'd shapes that produce on-wafer shapes that closely resembles the original design layer. The OPC procedure modifies one or more approximate design shapes within an approximation design layer to improve the process window of resulting OPC'd shapes. For example, in some embodiments, the OPC procedure may move one or more edges of the approximation design layer to improve the process window of the approximation design layer in a manner that causes a resulting on-wafer shape to more closely resemble an original design shape (e.g., that mitigates corner rounding, line end shortening, etc.).

The difference between the original design layer and the approximation design layer allows for a different OPC procedure to be used for correction of the approximation design layer than that which would have been used for correction of the original design layer. In some embodiments, by performing OPC on the approximation design layer rather than on the original design layer, an OPC procedure having a greater number of degrees of freedom may be used. The greater number of degrees of freedom provided by the approximation design layer can improve a process window and/or convergence of an OPC procedure, for example.

In some embodiments, the OPC procedure of act 106 may be performed by separating respective edges of an approximation design shape into a plurality of distinct edges, at 108. For example, in some embodiments, an edge of an approximation design shape having a length L may be separated into n contiguous, distinct edges respectively having a length L/n. One or more of the distinct edges are then selectively moved to adjust the shape of the approximation design shape in a manner that mitigates optical proximity effects, at 110. For example, in some embodiments, one or more distinct edges of an approximation design shape may be moved to form resolution enhancement features (e.g., serifs or hammerheads) within a resulting OPC'd shape.

At 112, the OPC'd shapes generated from the approximation design layer are written to a photomask set. In various embodiments, the photomask set may comprise a single mask set or a multi-mask set containing a binary mask, an alternating phase-shift mask, or an attenuated phase-shift mask. In some embodiments, writing the OPC'd shapes results in a photomask having horizontal and vertical edges at a position corresponding to an angled edge (e.g., a substantially 45° edge) within the original design layer.

Therefore, method 100 performs an OPC procedure on an approximation design layer rather than on an original design layer to enable the OPC procedure to operate according to a greater number of degrees of freedom. By operating according to a greater number of degrees of freedom, the OPC procedure can improve convergence of the OPC model to improve a corresponding on-wafer shape.

FIGS. 2-5 illustrate some embodiments of an integrated chip design upon which a method of optical proximity correction is performed. Although FIGS. 2-5 are described in relation to method 100, it will be appreciated that the structures disclosed in FIGS. 2-5 are not limited to such a method.

Figure 2:
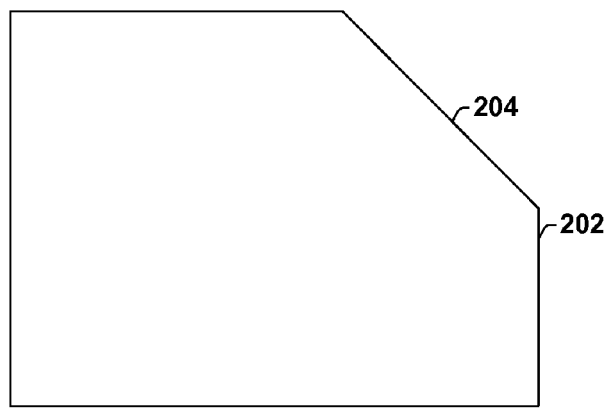
FIGS. 2-5 illustrate some embodiments of an integrated chip design upon which a disclosed method of performing an OPC procedure.

FIG. 2 illustrates some embodiments of a top-view corresponding to act 102. The top-view shows an integrated chip (IC) design 200 comprising a graphical representation of an integrated chip. The IC design 200 comprises an original design shape 202 formed on an original design layer. The original design shape 202 comprises a polygon having a number of contiguous edges. One of the edges comprises a 45° edge 204 having a 45° slope. In some embodiments, the IC design 200 may comprise additional design shapes (not shown) that may be located in proximity to original design shape 202 or which may be coupled to original design shape 202.

In some embodiments, the IC design 200 may comprise a Graphic Database System (GDS) file, such as a GDS or GDSII file. In other embodiments, the IC design 200 may comprise a CIF file, an OASIS file, or some other similar file format, for example. In some embodiments, the IC design 200 may be formed by a designer using a design software program running on an electronic design automation (EDA) tool. In other embodiments, the IC design 200 may be formed by an automatic place and route tool configured to automatically place the original design shape 202 within the IC design 200.

It will be appreciated that the original design layer may comprise any design layer. In some embodiments, the original design layer may comprise an original design shape 202 having a metal interconnect shape. For example, the original design shape 202 may comprise a metal shape on a first back-end-of-the-line (BEOL) metal layer. In other embodiments, the original design layer may comprise a polysilicon layer, for example.

Figure 3:
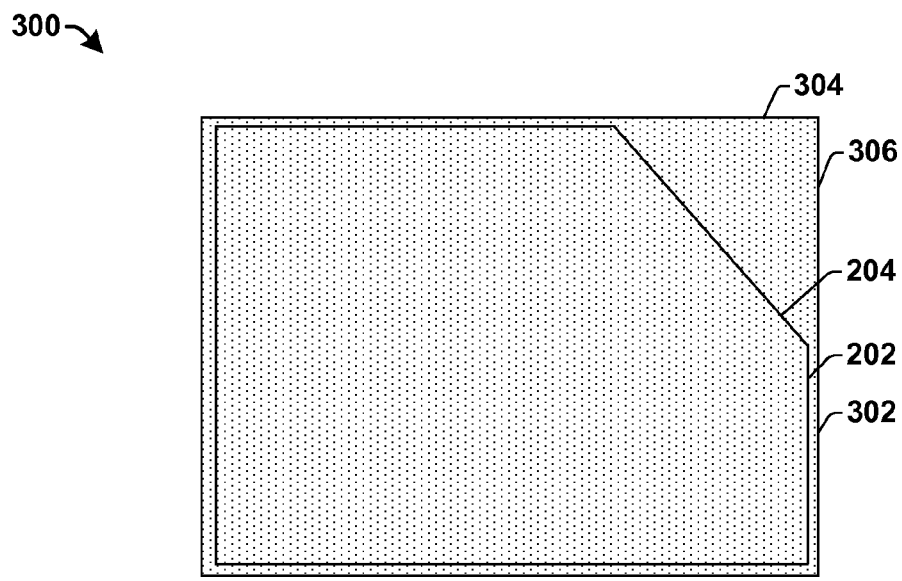

FIG. 3 illustrates some embodiments of a top-view 300 corresponding to act 104. As shown in top-view 300, an approximation design shape 302 (on an approximation design layer) is generated from the original design shape 202. Since the 45° edge 204 may cause convergence problems during a subsequent OPC procedure, the 45° edge 204 is replaced with a horizontal edge 304 and a vertical edge 306 within the approximation design shape 302. The horizontal and vertical edges, 304 and 306, will not cause convergence problems during the subsequent OPC procedure, as explained below.

In some embodiments, the original design shape 202 may comprise a subset of the approximation design shape 302. For example, as shown in top-view 300 the original design shape 202 is contained within the bounds of the approximation design shape 302. In other embodiments, the original design shape 202 may extend outside of the approximation design shape 302.

Figure 4:
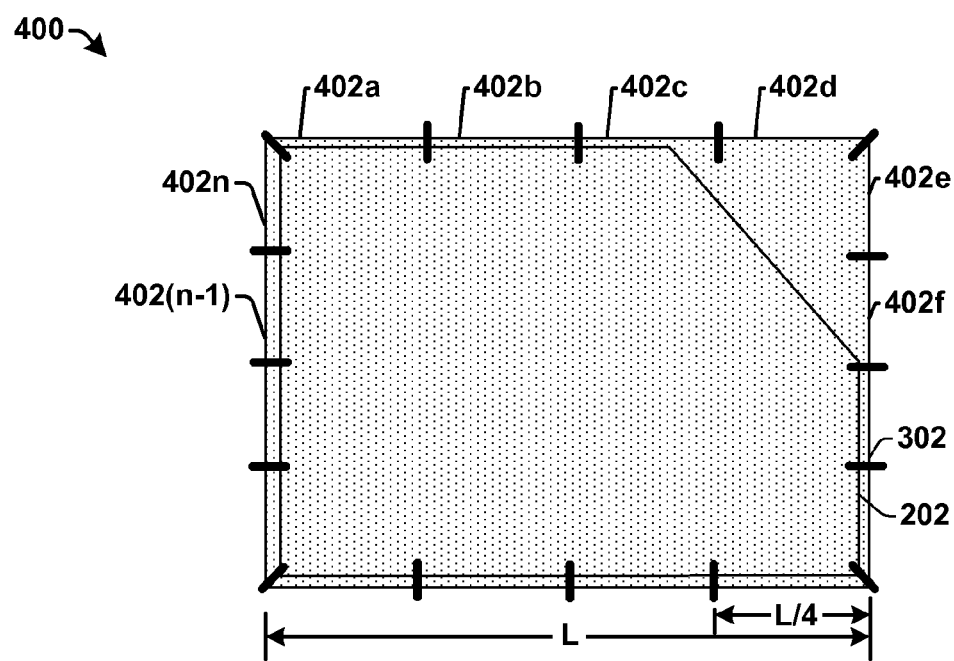

FIG. 4 illustrates some embodiments of a top-view 400 corresponding to act 106. As shown in top-view 400, during an OPC procedure one or more edges of the approximation design shape 302 are separated into a plurality of distinct edges 402a-402n. For example, a top edge of the approximation design shape 302, which has a length L is separated during an OPC procedure into distinct edges 402a-402d, which respectively have a length L/4. The plurality of distinct edges 402a-402n are contiguous, so that the plurality of distinct edges 402a-402n collectively form the approximation design shape 302.

Figure 5:
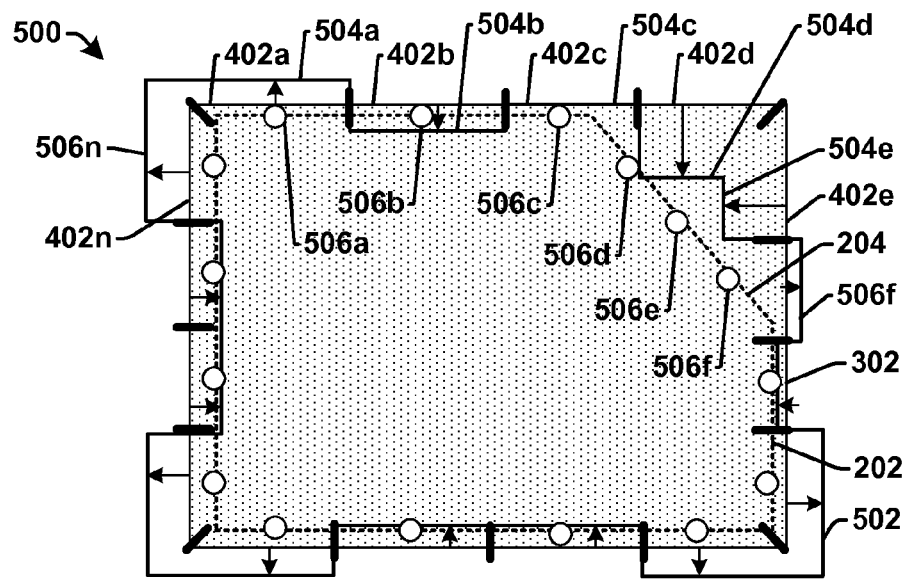

FIG. 5 illustrates some embodiments of a top-view 500 corresponding to act 108. As shown in top view 500, one or more of the distinct edges 402a-402n of the approximation design shape 302 are selectively moved to form an OPC'd shape 502 (located within an OPC'd layer) that corrects proximity effects of the original design shape 202. For example, edge 402a is moved outward to form OPC'd edge 504a, while edge 402b is moved inward to form OPC'd edge 504b. One or more of the distinct edges 402a-402n of the approximation design shape 302 are moved in a non-perpendicular direction with respect to edges of the original design shape 202. For example, edges 402d and 402e are moved at 45° angles with respect to the 45° edge 204 of the original design shape 202 to form edges OPC'd 504d and 504e, respectively.

The OPC'd shape 502 will change during processing to form an on-wafer shape that meets the target points 506a-506n. In some embodiments, the OPC procedure selectively adds assist features to the approximation design shape 302 that enable the OPC'd shape 502 to meet the target points 506a-506n. For example, by moving edges 402a and 402n outward to respectively form OPC'd edges 504a and 504n, a hammerhead is formed that reduces corner rounding. The assist features are configured to improve the process window of the OPC'd shape 502, thereby allowing for on-wafer shapes to more closely correspond to original design shape 202.

Figure 6A:
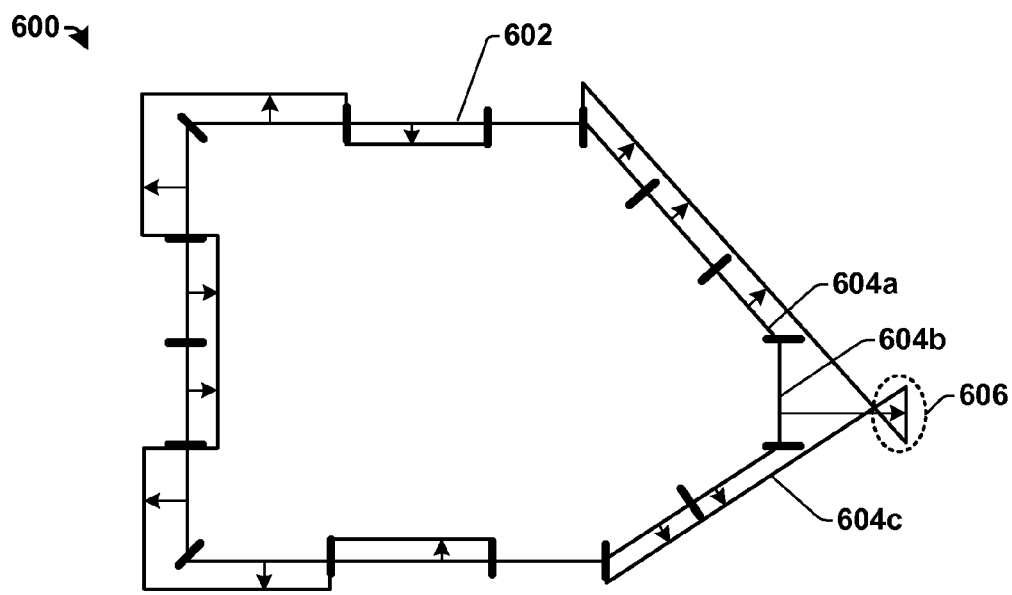
FIGS. 6A-6B illustrate some embodiments of top-views of an IC design that illustrate differences between an OPC procedure performed on an original design layer and an OPC procedure performed on an approximation design layer.
Figure 6B:
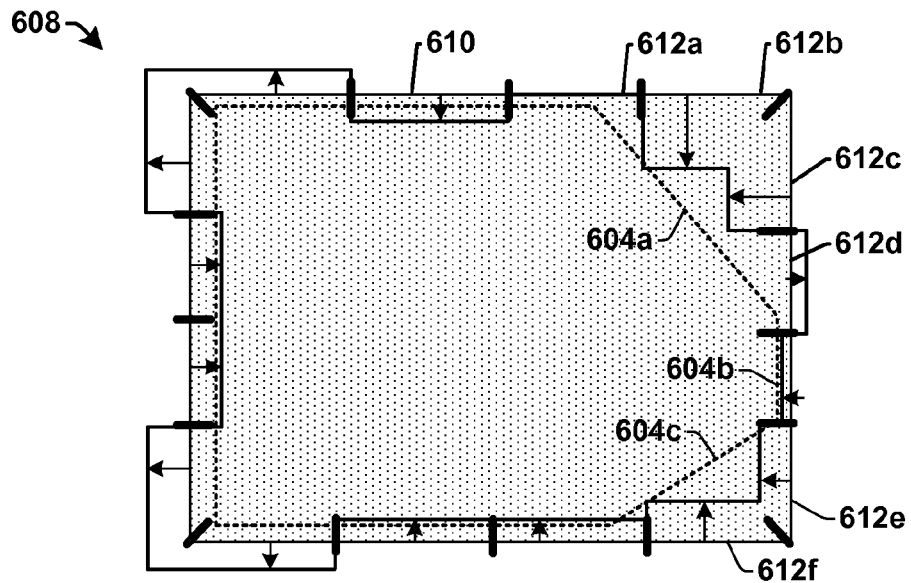

FIGS. 6A-6B illustrate some embodiments of top views, 600 and 608, of an IC design that illustrate the difference between an OPC procedure performed on an original design shape 602 and an OPC procedure performed on an approximation design shape 610. As will be more fully appreciated below, by performing the OPC procedure on the approximation design shape 610 rather than on the original design shape 602, the OPC procedure may have a greater number of degrees of freedom.

For example, FIG. 6A illustrates a top-view 600 that shows the movement of one or more of the distinct edges of the original design shape 602 to correct proximity effects. The original design shape 602 comprises mirror imaged 45° edges, 604a and 604c, separated by an interconnecting vertical edge 604b. During an OPC procedure, edges 604a-604c cannot be moved outward without generating the negative polygon 606. Therefore, since edges 604a-604c can move inward but not outward, the original design shape 602 provides an OPC procedure with a limited number of degrees of freedom that can be used for OPC correction.

In contrast, FIG. 6B illustrates a top-view 600 that shows the movement of one or more of the distinct edges of the approximation design shape 610 to correct proximity effects. To generate the approximation design shape 610, the mirror imaged 45° edges, 604a and 604c, and the interconnecting vertical edge 604b are replaced by horizontal and vertical edges 612a-612f. During an OPC procedure on the approximation design shape 610, edges 612a-612f can be moved outward without generating a negative polygon. Therefore, since edges 612a-612f can be moved both inward and outward, the approximation design shape 610 provides an OPC procedure with a larger number of degrees of freedom than the OPC procedure used on the original design shape 602.

Figure 7:
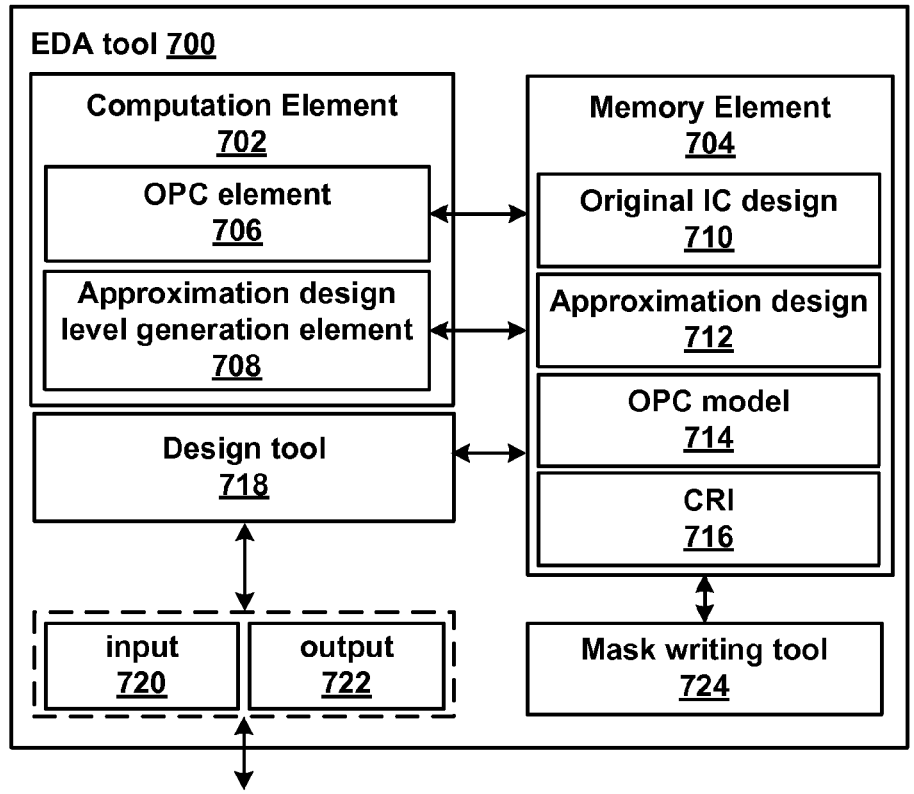
FIG. 7 illustrates a block diagram of some embodiments of an EDA (Electronic design automation) tool configured to execute the disclosed method of performing an optical proximity correction procedure.

FIG. 7 illustrates a block diagram of some embodiments of an EDA (Electronic design automation) tool 700 configured to execute the disclosed method of optical proximity correction.

The EDA tool 700 comprises a computation element 702 and a memory element 704. The computation element 702 comprises an OPC element 706 and an approximation design level generation element 708. The memory element 704 is configured to store an original integrated chip (IC) design 710 (e.g., a GDS or GDSII file, a CIF file, or an OASIS file), an approximation design 712, an OPC (optical proximity correction) model 714, and computer readable instructions (CRI) 716 that provide for a method of operating one or more components of the EDA tool according to disclosed method 100. In various embodiments, the memory element 704 may comprise an internal memory or a computer readable medium.

The approximation design level generation element 708 is configured to generate the approximation design 712 from the original IC design 710. The approximation design 712 is different from a layout of the original IC design 710.

The OPC element 706 is configured to selectively access the OPC model 714, and based thereupon to perform an OPC procedure on the approximation design 712 to reduce proximity effects in the original IC design 710. For example, the OPC element 706 may add assist features to one or more shapes within the approximation design 712.

The EDA tool 700 further comprises a design tool 718 configured to generate the original IC design 710. In some embodiments, the design tool 718 may comprise an automatic place and route tool configured to selectively route shapes on a plurality of design levels to generate the original IC design 710. In other embodiments, the design tool 718 may comprise a user interactive design environment that allows for designers to generate the original IC design 710. In such embodiments, the EDA tool 700 may comprise an input device 720 and/or an output device 722. The input device 720 is configured to allow a user to interact with the original IC design 710 and in various embodiments may comprise a keyboard, mouse, and/or any other input device. The output device 722 is configured to provide a graphical representation of the original IC design 710 that can be viewed by a user. In various embodiments, the output device 722 may comprise a monitor, for example.

In some embodiments, the EDA tool 700 may further comprise a mask writing tool 724. The mask writing tool is configured to generate a mask set comprising shapes corresponding to the approximation design 712. In various embodiments, the mask set may comprise a binary mask, an alternating phase-shift mask, or an attenuated phase-shift mask. In some embodiments, the mask set may comprise a single mask set or a multi-mask set (e.g., a double mask set, a triple mask set, etc.).

It will be appreciated that while reference is made throughout this document to exemplary structures in discussing aspects of methodologies described herein (e.g., the IC design presented in FIGS. 2-5, while discussing the methodology set forth in FIG. 1), that those methodologies are not to be limited by the corresponding structures presented. Rather, the methodologies (and structures) are to be considered independent of one another and able to stand alone and be practiced without regard to any of the particular aspects depicted in the Figs. Additionally, layers described herein, can be formed in any suitable manner, such as with spin on, sputtering, growth and/or deposition techniques, etc.

Also, equivalent alterations and/or modifications may occur to those skilled in the art based upon a reading and/or understanding of the specification and annexed drawings. The disclosure herein includes all such modifications and alterations and is generally not intended to be limited thereby. For example, although the figures provided herein, are illustrated and described to have a particular doping type, it will be appreciated that alternative doping types may be utilized as will be appreciated by one of ordinary skill in the art.

In addition, while a particular feature or aspect may have been disclosed with respect to only one of several implementations, such feature or aspect may be combined with one or more other features and/or aspects of other implementations as may be desired. Furthermore, to the extent that the terms "includes", "having", "has", "with", and/or variants thereof are used herein, such terms are intended to be inclusive in meaning—like "comprising." Also, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated herein.

The present disclosure relates to a method of performing an optical proximity correction (OPC) procedure to correct an original design layer, by operating upon an approximation design layer that is different than the original design layer.

In some embodiments, the present disclosure relates to a method of performing an optical proximity correction (OPC) procedure. The method comprises forming an integrated chip (IC) design comprising a graphical representation of an integrated chip, wherein the IC design has an original design layer comprising one or more original design shapes. The method further comprises generating an approximation design layer from the original design layer, wherein the approximation design layer is different than the original design layer. The method further comprises performing an optical proximity correction (OPC) procedure on the approximation design layer to form an OPC'd layer that produces on-wafer shapes that correspond to the one or more original design shapes.

In other embodiments, the present disclosure relates to a method of performing an optical proximity correction (OPC) procedure. The method comprises forming an integrated chip (IC) design comprising a graphical representation of an integrated chip having an original design layer comprising one or more original design shapes corresponding to structures that are to be formed on an integrated chip. The method further comprises generating an approximation design layer, from the original design layer, by replace a substantially 45° edge in the original design layer with a vertical edge having a 90° slope and a horizontal edge having a 0° slope in the approximation design layer. The method further comprises separating edges of the approximation design layer into a plurality of distinct edges that are contiguously connected. The method further comprises selectively moving the distinct edges to adjust a shape of the approximation design layer to form an OPC'd layer that produces on-wafer shapes that correspond to the one or more original design shapes.

In yet other embodiments, the present disclosure relates to an EDA (Electronic design automation) tool. The EDA tool comprises a memory element configured to store an integrated chip (IC) design comprising a graphical representation of an integrated chip, wherein the IC design has an original design layer comprising one or more original design shapes. The EDA tool further comprises an approximation design generation element configured to generate an approximation design layer from the original design layer, wherein the approximation design layer is different than the original design layer. The EDA tool further comprises an OPC element configured to perform an optical proximity correction (OPC) procedure on the approximation design layer to form an OPC'd layer that produces on-wafer shapes that correspond to the one or more original design shapes.

What is claimed is:

1. A method of performing an optical proximity correction (OPC) procedure, comprising:
    forming an integrated chip (IC) design comprising a graphical representation of an integrated chip, wherein the IC design has an original design layer comprising one or more original design shapes;
    generating an approximation design layer from the original design layer, wherein the approximation design layer is different than the original design layer; and
    performing an optical proximity correction (OPC) procedure on the approximation design layer, by dissecting the approximation design layer into a plurality of separate edges and then selectively moving one or more of the separate edges in a direction perpendicular to the separate edge, to form an OPC'd layer that produces on-wafer shapes that correspond to the one or more original design shapes,
    wherein a computing device is used to form the IC design, to generate the approximation design layer, or to perform the OPC procedure on the approximation design layer.

2. The method of claim 1, wherein generating the approximation design layer, comprises:
    modifying the original design layer to replace an angled edge with a vertical edge having a 90° slope and a horizontal edge having a 0° slope.

3. The method of claim 1, further comprising:
    writing the OPC'd layer generated from the approximation design layer onto a photomask.

4. The method of claim 3, wherein the OPC'd layer written onto the photomask comprises a horizontal edge and a vertical edge at positions corresponding to a 45° edge having a substantially 45° slope within the original design layer.

5. The method of claim 1, wherein performing the OPC procedure comprises:
    separating edges of the approximation design layer into plurality of distinct edges that are contiguously connected; and
    selectively moving one or more of the plurality of distinct edges to adjust a shape of the approximation design layer in a manner that mitigates optical proximity effects.

6. The method of claim 5, wherein the one or more of the plurality of distinct edges are selectively moved in a non-perpendicular direction with respect to corresponding edges of the original design layer.

7. The method of claim 1, wherein the original design layer is a subset of the approximation design layer.

8. The method of claim 1,
    wherein the original design layer comprises mirror imaged 45° edges separated by an interconnecting vertical edge, and
    wherein the OPC procedure is configured to move the mirror imaged 45° edges and the interconnecting vertical edge in an inward direction or in an outward direction opposite the inward direction.

9. A method of performing an optical proximity correction (OPC) procedure, comprising:
    forming an integrated chip (IC) design comprising a graphical representation of an integrated chip having an original design layer comprising one or more original design shapes corresponding to structures that are to be formed on an integrated chip;
    generating an approximation design layer, from the original design layer, by replacing a 45° edge having a substantially 45° slope in the original design layer with a vertical edge having a 90° slope and a horizontal edge having a 0° slope in the approximation design layer;
    separating edges of the approximation design layer into a plurality of distinct edges that are contiguously connected; and
    selectively moving the distinct edges to adjust a shape of the approximation design layer to form an OPC'd layer that produces on-wafer shapes that correspond to the one or more original design shapes,
    wherein a computing device is used to form the IC design, to generate the approximation design layer, to separate edges of the approximation design layer, or to selectively move the distinct edges.

10. The method of claim 9, further comprising:
writing the OPC'd layer generated from the approximation design layer onto a photomask.

11. The method of claim 10, wherein the OPC'd layer written onto the photomask comprises the horizontal edge and the vertical edge at positions corresponding to the 45° edge in the original design layer.

12. The method of claim 11, wherein the one or more of the plurality of distinct edges are selectively moved in a non-perpendicular direction with respect to corresponding edges of the original design layer.

13. The method of claim 11, wherein the original design layer is a subset of the approximation design layer.

14. The method of claim 9, further comprising:
wherein the original design layer comprises mirror imaged 45° edges separated by an interconnecting vertical edge, and
wherein the OPC procedure is configured to move the mirror imaged 45° edges and the interconnecting vertical edge in an inward direction or in an outward direction opposite the inward direction.

15. An electronic design automation (EDA) tool, comprising:
a memory element comprising an electronic storage unit configured to store an integrated chip (IC) design comprising a graphical representation of an integrated chip, wherein the IC design has an original design layer comprising one or more original design shapes;
an approximation design generation element comprising a first computing device configured to generate an approximation design layer from the original design layer, wherein the approximation design layer is different than the original design layer; and
an OPC element comprising a second computing device configured to perform an optical proximity correction (OPC) procedure on the approximation design layer, la dissecting the approximation design layer into a plurality of separate edges and then selectively moving one or more of the separate edges in a direction perpendicular to the separate edge, to form an OPC'd layer that produces on-wafer shapes that correspond to the one or more original design shapes.

16. The EDA tool of claim 15, wherein generating the approximation design layer, comprises:
modifying the original design layer to replace a 45° edge having a substantially 45° slope with a vertical edge having a 90° slope and a horizontal edge having a 0° slope.

17. The EDA tool of claim 15, further comprising:
a mask writing tool configured to write the OPC'd layer generated from the approximation design layer onto a photomask.

18. The EDA tool of claim 15, wherein the OPC element is configured to:
separate edges of the approximation design layer into a plurality of distinct edges that are contiguously connected; and
selectively move one or more of the plurality of distinct edges to adjust a shape of the approximation design layer in a manner that mitigates optical proximity effects.

19. The EDA tool of claim 18, wherein the one or more of the plurality of distinct edges are selectively moved in a non-perpendicular direction with respect to corresponding edges of the original design layer.

20. The EDA tool of claim 15,
wherein the EDA tool is configured to receive the integrated chip design from a design tool and to store the integrated chip design in the memory element; and
wherein the EDA tool is configured to process the received integrated chip design to perform the OPC procedure.

* * * * *

UNITED STATES PATENT AND TRADEMARK OFFICE
CERTIFICATE OF CORRECTION

| | | |
|---|---|---|
| PATENT NO. | : 8,972,909 B1 | Page 1 of 1 |
| APPLICATION NO. | : 14/038943 | |
| DATED | : March 3, 2015 | |
| INVENTOR(S) | : Chia-Cheng Chang et al. | |

It is certified that error appears in the above-identified patent and that said Letters Patent is hereby corrected as shown below:

In the Claims

Column 9, Claim 15, Line 36 Please replace "...design layer, la" with --... design layer, by--

Signed and Sealed this
Twenty-sixth Day of May, 2015

Michelle K. Lee
*Director of the United States Patent and Trademark Office*